United States Patent [19]
Villa

[11] Patent Number: 4,972,420
[45] Date of Patent: Nov. 20, 1990

[54] FREE ELECTRON LASER

[75] Inventor: Francesco Villa, Alameda, Calif.

[73] Assignee: Harris Blake Corporation, Great Neck, N.Y.

[21] Appl. No.: 461,058

[22] Filed: Jan. 4, 1990

[51] Int. Cl.[5] .............................................. H01S 3/00
[52] U.S. Cl. .................................... 372/2; 328/233
[58] Field of Search .................... 372/2, 37; 328/233

[56] References Cited

U.S. PATENT DOCUMENTS 4,720,832 1/1988 Deki .................................. 372/37
4,893,089 1/1990 Villa ................................ 328/233

*Primary Examiner*—Leon Scott, Jr.
*Attorney, Agent, or Firm*—Ostrolenk, Faber, Gerb & Soffen

[57] ABSTRACT

A high gain, single-pass free electron laser formed of a high brilliance electron injector source, a linear accelerator which imparts high energy to the electron beam, and an undulator capable of extremely high magnetic fields, yet with a very short period. The electron injector source is the first stage (gap) of the linear accelerator or a radial line transformer driven by fast circular switch. The linear accelerator is formed of a plurality of accelerating gaps arranged in series. These gaps are energized in sequence by releasing a single pulse of energy which propagates simultaneously along a plurality of transmission lines, each of which feeds the gaps. The transmission lines are graduated in length so that pulse power is present at each gap as the accelerated electrons pass therethrough. The transmission lines for each gap are open circuited at their ends. The undualtor has a structure similar to the accelerator, except that the transmission lines for each gap are substantially short circuited at their ends, thus converting the electric field into magnetic field. A small amount of resistance is retained in order to generate a small electric field for replenishing the electron bunch with the energy lost as it traverses through the undulator structure.

6 Claims, 7 Drawing Sheets

10

RLT | LOW ENERGY e BEAM | LINAC | HIGH ENERGY e BEAM | UNDULATOR | X-RAYS & ELECTRON BEAM 20 30 40

FREE ELECTRON LASER

BACKGROUND OF THE INVENTION

1. Field of the Invention:

The present invention relates generally to free electron lasers and, more specifically, to a high gain, single pass free electron laser (FEL) with a new pulse power undulator capable of producing extremely high magnetic fields with a very short period.

2. Description of the Related Art

Ordinary gas and solid-state lasers are monochromatic; i.e., they can generate only specific wavelengths corresponding to energy transitions in their lasing media. Dye lasers can be tuned over a narrow range but require a gas laser for optical pumping and can operate only at relatively low power levels.

In contrast, the free electron laser as described in Madey U.S. Pat. No. 3,822,410 presents an extremely adaptable source of coherent radiation because it can be tuned to virtually any wavelength, and it operates at high power. In a free electron laser, high-energy electrons (i.e. electrons that have been accelerated to velocities approaching the speed of light) travel in a beam through a vacuum instead of remaining attached to the atoms of a lasing medium. Because the electrons are free, the wavelength of the radiation they emit is not confined to a particular wavelength corresponding to a permitted transition between two energy levels of an atom. Radiation is produced when the high energy electron beam is passed through a transverse, spatially periodic magnetic field produced by an assembly of magnets known as an undulator. The magnetic field of the undulator bends the beam of electrons back and forth in the traverse direction. Each time an electron in the beam is deflected, it emits a burst of synchrotron (broadband or incoherent) radiation. If the laser is appropriately designed so that the oscillations add to each other, the combination of individual bursts yields a beam of coherent radiation at a wavelength approximately given by:

$$\lambda_r = \frac{\lambda_o}{2\gamma^2}\left(1 + \frac{k^2}{2} + \gamma^2\theta^2\right) \quad (1)$$

where:

$\lambda_r$ is the wavelength of coherent light (in cm)

$\lambda_o$ is the undulator period, i.e., the distance between adjacent magnets of opposite polarity (in cm).

$\gamma$ is the electron energy divided its rest mass energy; and k is a parameter defined by $$k = \frac{eB\lambda_o}{\pi mc^2} = 0.934\ B\lambda_o \quad (2)$$

where B is the rms of the magnetic field (in Tesla).

As seen from the equation (1) above, the output wavelength of a free electron laser can be tuned by varying the electron energy (proportional to $\gamma$). For short wavelength lasing (in the x-ray region of the spectrum), a free electron laser needs electron energies on the order of 1 GeV, which is extremely high.

The size of the FEL is also a problem because the distance between adjacent poles of the magnet is limited by equation (2). Since $k \propto B\lambda_o$ and it is desirable for $k \approx 1$, if $\lambda_o$ (the distance between adjacent N and S poles of a magnet) is decreased by a factor of 10, B must be increased by a factor of 10, and 10 Tesla is impractical for ordinary magnets, requiring on the order of 100 poles in series.

In addition to the difficulty of obtaining the necessary magnetic field strength and electron beam emittance, the gain of the device becomes a problem for emission in the short (<1000 Angstroms) region of the spectrum. If the single-pass gain is less than unity, it becomes necessary to pass the photon beam axially back and forth through the undulator to obtain lasing (light amplification). In ordinary free-electron lasers, this is accomplished by mirrors at opposite ends of the undulator structure. However, there are no mirrors capable of reflecting x-rays. The solution is to make the laser superradiant, resulting in light amplification in a single pass through the undulator. See, e.g., R. Bonifacio and F. Casagrande, "The Superradiant Regime of a Free Electron Laser", *Nuclear Instruments and Methods in Physics Research* A239 (1985) pp. 36–42.

To obtain superradiance, the electron beam must be very dense (i.e., it must have an extremely high brilliance and must be of low emittance), and the magnetic field strength must be very strong with a very short period.

SUMMARY OF THE INVENTION

The FEL of the present invention has a novel structure which is designed to overcome the above-noted problems associated with short-wavelength lasing.

Specifically, the FEL of the present invention is formed of three basic components:

(1) a high brilliance electron/injector source;

(2) a linear accelerator (linac) which imparts high energy to the electron beam; and (3) an undulator capable of extremely high magnetic fields (many Teslas), yet with a very short period.

The electron injector/source is the first line of the linac itself, or a radial line transformer driven by a fast circular switch.

The linac has the structure disclosed in U.S. application Ser. No. 244,121, filed Sept. 14, 1988, in which a plurality of accelerating gaps are arranged in series. These gaps are energized in sequence by releasing or switching a single pulse of energy which propagates simultaneously along a plurality of transmission lines, each of which feeds an individual one of the gaps. The transmission lines are graduated in length so that pulse power is present at each gap as the accelerated particle bunches pass therethrough.

The undulator of the present invention has the same basic structure as the linac, except that the ends of the transmission lines are substantially shorted, rather than open circuited, thus converting the electric field to a magnetic field. The "short circuit" is not complete, but rather is designed to have a small amount of resistance so that a small fraction of the electric field remains. This electric field compensates for the energy lost by the beam in the form of radiation as it traverses each gap of the undulator.

BRIEF DESCRIPTION OF THE DRAWINGS

These and other features and advantages of the present invention will become apparent when the following text is read in conjunction with the accompanying drawings, in which:

FIGS. 1A and 2A are block diagram and schematic illustrations, respectively, of the FEL of the present invention;

DETAILED DESCRIPTION OF THE PREFERRED EMBODIMENT

Figures 1A, 1B:
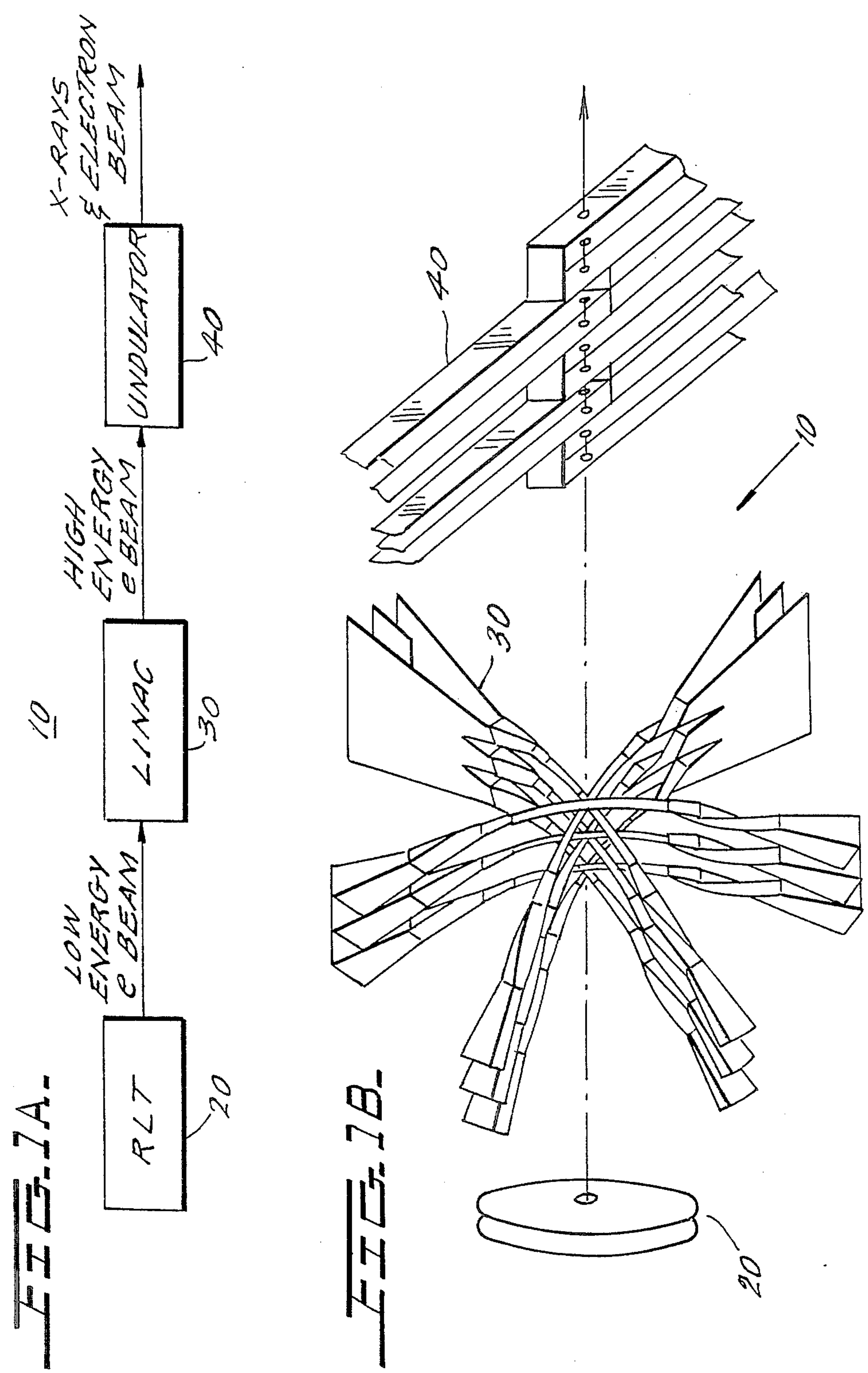

Now referring to the Figures, and more particularly to FIGS. 1A and 1B, which illustrate free electron laser (FEL) 10 in block diagram and schematic form, respectively, as consisting of an injector 20, an accelerator 30 and an undulator 40.

Figure 2:
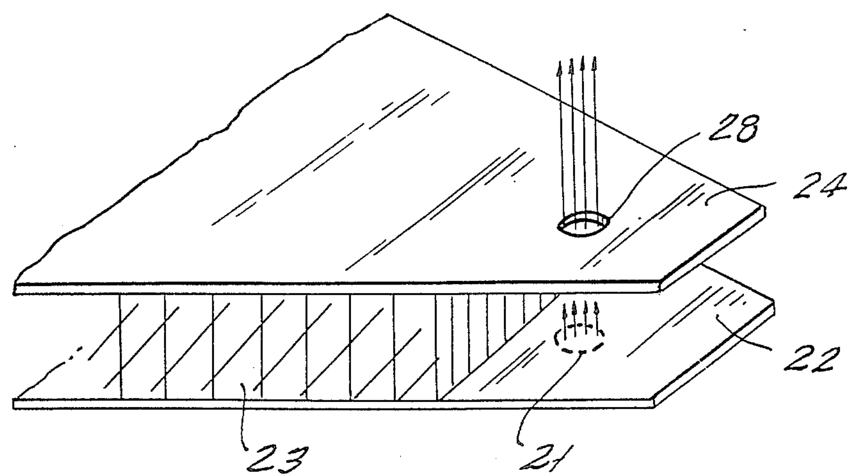
FIG. 2 is a schematic of the first stage of the linac configured for use as an electron injector.

Injector 20 is a radial line transformer (RLT) as shown in FIGS. 1B and 1B or, more preferably, the first stage stage of linac 30 as illustrated in FIG. 2. In the embodiment of FIG. 2, electrons are extracted from the area identified by reference numeral 21 by a pulse of electric field between plates 22 and 24. The extracted electrons pass through aperture 28 in plate 24, and then enter the accelarating structure of linac 30.

The pulse applied to injector 20 is preferably provided by a Blumlein-type switch (described later) with a rise time on the order of tens of picoseconds. Injector 20 can be loaded with a high dielectric constant material 23 (such as sapphire, quartz or other high frequency, low loss plastic dielectric) to further increase the gain and to eliminate fluctuations of amplitude and pulse shape due to field emission current.

The above described injector of the present invention provides an electron source of extremely high brilliance and low emittance because of the very large electric field applied to the anode/cathode gap. As mentioned above, low emittance and high brilliance are necessary for short wavelength superradiance: the shortest wavelength is on the order of the electron beam emittance and high gain on a single pass is possible only with high current density.

The electron bunch extracted from injector 20 leaves the injector with an energy on the order of 3 Mev. However, for short wavelength lasing, the FEL needs electron energies on the order of a few hundred Mev up to 1 Gev. Therefore, it is necessary to add energy to the electron bunch; this is accomplished by linac 30.

Figure 3:
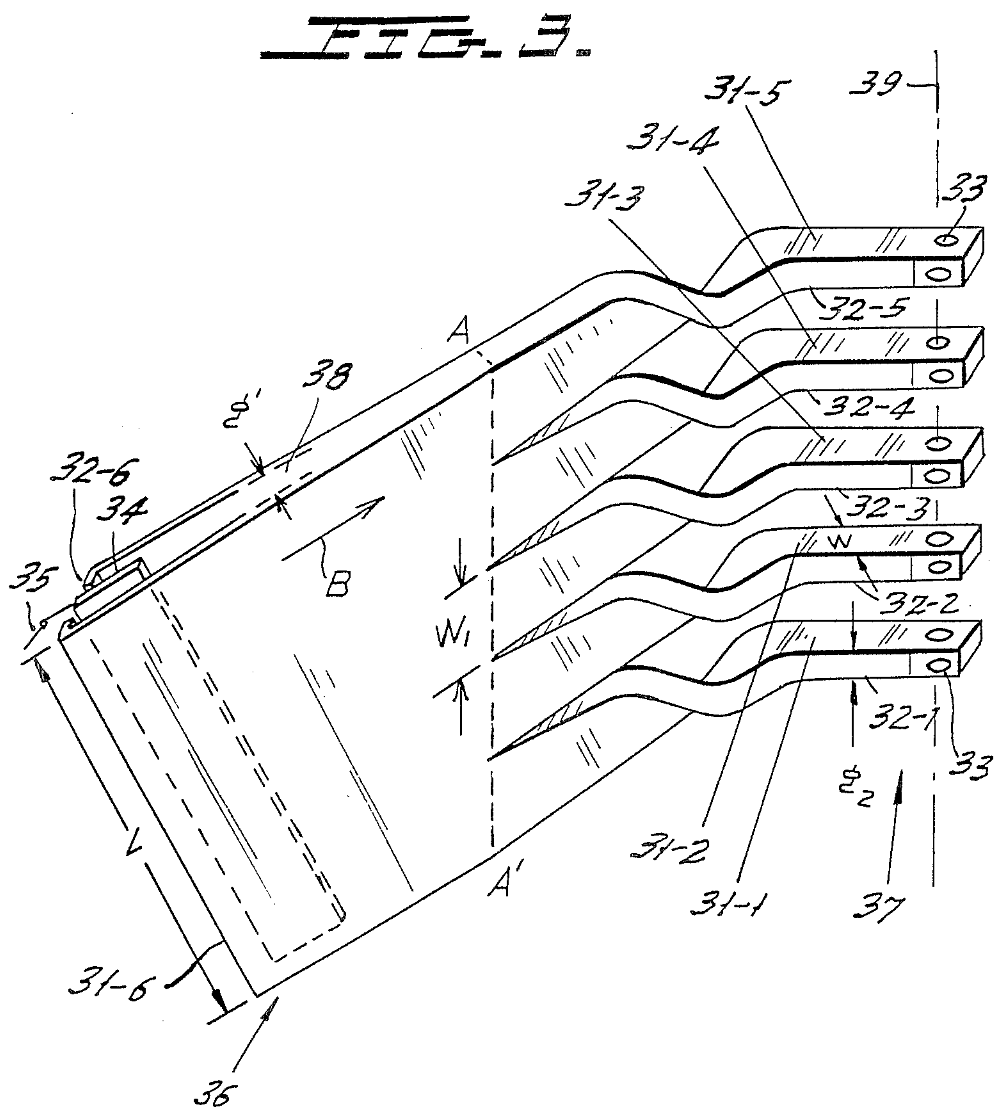
FIG. 3 is a perspective, partly schematic illustration of one element of the multi-element linac used in the present invention.

FIG. 3 shows one element of the multi-element linac 30, which is described and claimed in Ser. No. 07/244,121, filed Sept. 14, 1988, now U.S. Pat. No. 4,893,089 and in F. Villa, "A New Switched Power Linac Structure," SLAC-PUB-4894 (March 1989), the disclosures of which is herein incorporated by reference. Briefly, linac 30 comprises a plurality of accelerating gaps arranged in series. These gaps are energized in sequence by releasing or switching a single pulse of energy which propagates simultaneously along a plurality of transmission lines, each of which feeds an individual one of the gaps. The transmission lines are graduated in length so that the power pulse is present in each gap as the accelerator electron bunch passes therethrough.

More particularly, linac 30 of FIG. 3 includes spaced parallel plates 31, 32 which, in their longitudinal midregions are slit longitudinally to form narrow strips or ribbons 31-1—32-5 which are bent so that they are disposed in planes that are at right angles to the planes wherein the non-bent and portions of plates 31, 32 are disposed (alternatively, the accelerator could have the "no twist" structure described in commonly owned application OFGS File M-11720 (417-18), filed on even date herewith). At the center of each of the ribbons 31-1—32-5, there is an aperture 33 through which the generally straight line particle path 39 extends. The means for injecting power into linac 30 is illustrated schematically by charge storage plate 34 and normally open switch 35. Storage plate 34 is disposed between transmission line plates 31, 32 at power input region 36. The injector for linac 30 is illustrated on the left side of FIG. 3 and on two right units of linac 30 in FIG. 2. The switch 35 is symbolically shown in FIG. 3 only on the upper left corner. In a true structure, the switch will be uniform along the center electrode 34.

In the portion of linac 30 between apertures 33 and the dashed line A—A', the slits which are cut in plates 31, 32 to form ribbons 31-1—32-5 commence at line A—A', which is nonparallel with respect to the end edges 31-6, 32-6 of the respective plates 31, 32. This means that it takes a power pulse that is injected at region 36 a longer time to reach ribbons 31-5, 32-5 than to reach ribbons 31-1, 32-1. Thus, the accelerating energy reaches the segment of accelerating path 39 between ribbons 31-1, 32-1 before reaching the segment between ribbons 31-5, 32-5 to effectively provide an energy gradient that appears to travel along accelerating path 39 in an upward direction with respect to FIG. 3.

Dielectric material 38 fills the space between plates 31, 32 except at the central portions of ribbons 31-1—32-5 having apertures 33 through which accelerating path 39 extends. The transit time for energy pulses is controlled by the dielectric constant of the material for insulator 38. Tapering of the space between plates 31 and 32, with spacing $g_1$ at injection region 36 being greater than spacing $g_2$ at accelerating region 37, controls the electric field at accelerating region 37. To further increase the electric field, each of the ribbons 31-1—32-5 has a width $W_1$ at its pulse injection and larger than its width $W_2$ at the accelerating region 37.

Figure 4:
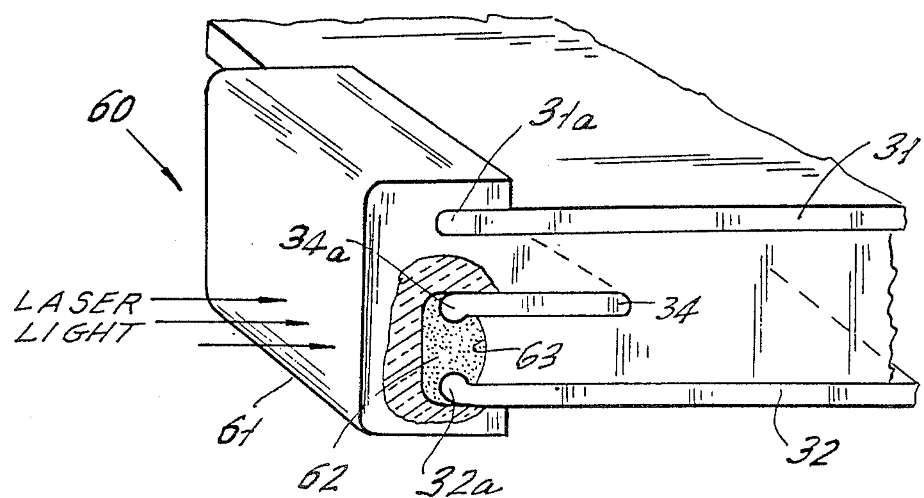
FIG. 4 is a schematic of a high speed switching device that is used for injecting pulse power into the linac.

FIG. 4 illustrates a switch 60 for producing the single pulse of energy into linac 30. Switch 60 is a laser triggered, gas avalanche switch used for reliable ultrafast switching of relatively high currents at moderately high voltages. Such a switch is described in R. E. Cassel, F. Villa, "High Speed Switching in Gases," SLAC-PUB-4858 (February 1989). Although gas avalanche switch 60 is the preferred switch, other switches (such as solid state and photoelectric) are equally viable, even though they are less efficient.

The preferred gas avalanche switch 60 shown in FIG. 4 is a Blumlein-type pulse forming network which includes shaped quartz element 61 that is transparent to UV light and is provided with cavity 63 that is filled with a gas 62 pressurized to say 30 Atm. Cavity 63 extends for approximately the width of storage electrode 34 whose shaped edge portion 34a is disposed within cavity 63. Shaped edge portion 32a of transmission line plate 32 is disposed within cavity 63 while plate 31 does not extend into cavity 63. Edge portion 31a of plate 31 is disposed within slot 61a of quartz element 61. Portions of quartz element 60 are interposed between electrode 34 and plates 31, 32 and directly between plates 31, 32 in the region of electrode 34.

Initial ionization of gas 62 results from laser light that is directed into cavity 63 and concentrated relatively close to anode electrode 34a of anode 34. This causes electrons to avalanche towards anode electrode 34a. The ionized region will spread away from the initial distribution because electrons produced by the avalanche will ionize the surrounding gas 62, and because the electrons are moving under the influence of the electric field. The displacement current of the electron avalanche will induce a pulse across plates or electrodes 31, 32.

Because of the extremely short duration of the electrical pulse, the peak gradient of linac 30 is very high, in the order of 3 Gv/m, so that the length of a linac could be of the order of 1 meter for 1 GeV electron energy. Magnetic focusing devices (quadrupoles and higher) needed to maintain beam stability are not indicated, and are obvious to those skilled in the art.

Undulator 40 is structurally similar to linac 30, and also operates on pulse power techniques. The primary difference is that the end of each section of undulator 40 is shorted to maximize the magnetic field (rather than open circuited as in the case of linac 40). The theory behind the structure is as follows.

Consider a parallel plate line of impedance Z terminated on a load R. For R=Z, no pulse is reflected from the termination and E and B are related by $E/\kappa=B$ ($\kappa$ is the speed of light).

In general, one can trade magnetic field for electric field (at some distance from the termination) by changing the value of R due to the superposition of the initial pulse and its reflection.

$$E = \frac{E_T 2R}{(Z+R)}$$

and $$B = \frac{E_T 2Z}{\kappa(Z+R)}$$

where $E_T$ is the electric field associated to the wave travelling structure, before the termination.

From the above two formulas, it can be seen that the magnetic field can be doubled and the electric field can be reduced to zero, when R=0 (short circuit termination). Conversely, the electric field can be doubled and the magnetic field can be reduced to zero when $R=\infty$ (or R much greater in value than Z, the line's characteristic impedance). Between these two extremes for R, there is a continuous set of values of B from zero to 2B, and a corresponding set of electric field from 2E to zero, respectively. Thus, to maximize the electric field, the ends of the individual transmission lines of linac 30 are open circuited. In contrast, in undulator 40, the ends of the transmission lines are shorted to maximize the magnetic field.

The lines forming undulator 40 differ from the accelerator lines because the magnetic field required by the undulator alternates its sign. This is achieved by the structure consisting of a central conductor surrounded by two ground planes.

Actually, the transmission lines in undulator 40 are not completely shorted. Instead, a small impedance is included to retain a small amount of electric field to compensate for the electron bunch energy lost due to radiation during the traversal of every gap of the undulator. The added energy from the small amount of electric field keeps the beam in the limits required for coherence, without tapering of the undulator structure. The small residual electric field can be tuned by an appropriate geometry of the shorting elements and/or by the use of a slightly resistive material as a termination.

Figure 5A:
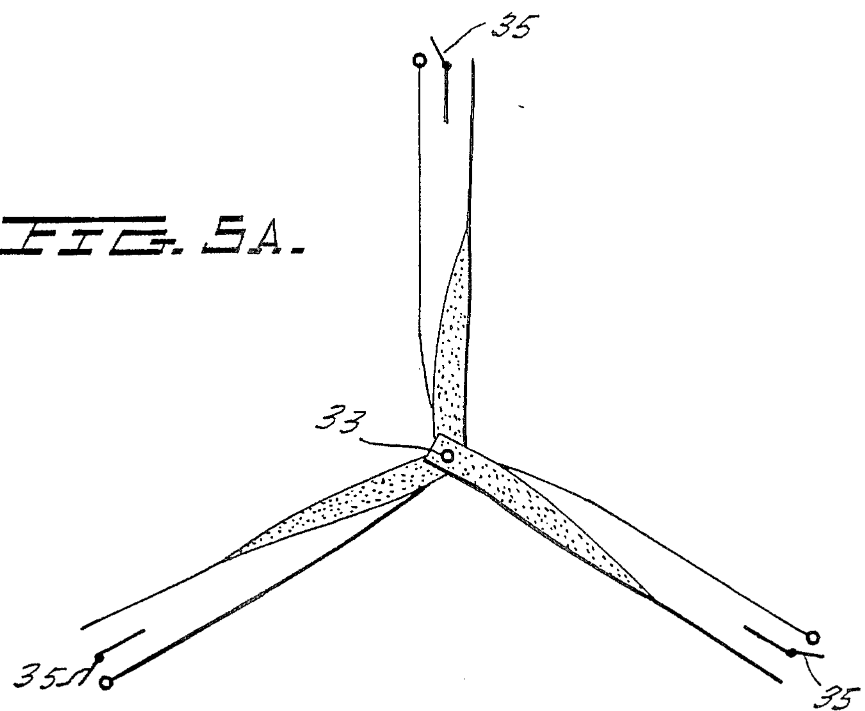
FIGS. 5A is a beam end view of the accelerator structure and FIG. 5B is an expanded view of the tip ends of two adjacent lines in the undulator.
Figure 5B:
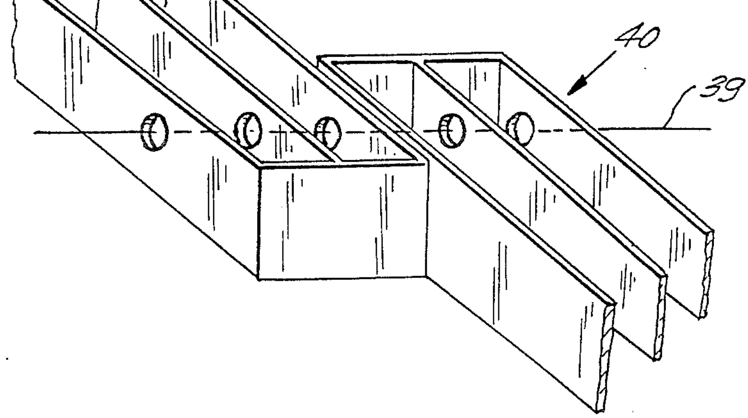

The geometry of accelerator 30 and undulator 40 also differ. As shown in FIG. 2 and in FIG. 5A (beam end view of the accelerator), the accelerator lines in linac 30 converge toward the beam from different directions (60° apart); in contrast, as shown in FIG. 2 and in FIG. 5B (expanded view of the tip ends of two adjacent lines in the undulator), the undulator 40 lies in a single plane only.

Figure 6A:
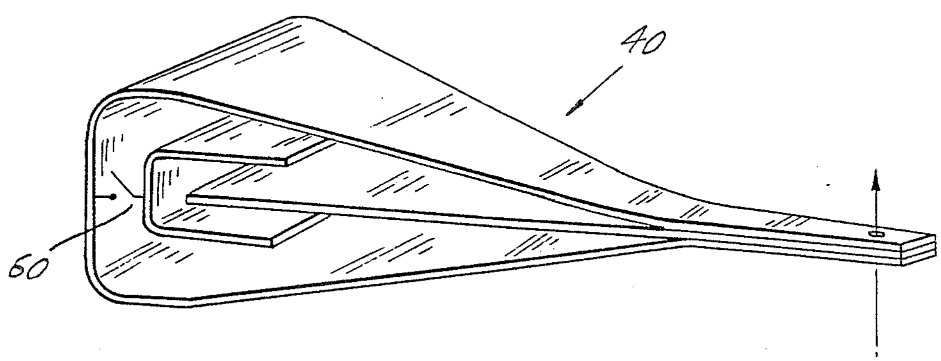
FIG. 6A is a schematic of one element of the undulator used in the present invention and FIG. 6B is an expanded view of the tip end of one element.

FIG. 6A as a schematic of one element of the undulator used in the present invention. The back portion 60 is a Blumlein configuration. Switch 60 runs all across the central plate. Switch 60 is analogous to the Blumlein switch used in linac 30.

Figure 6B:
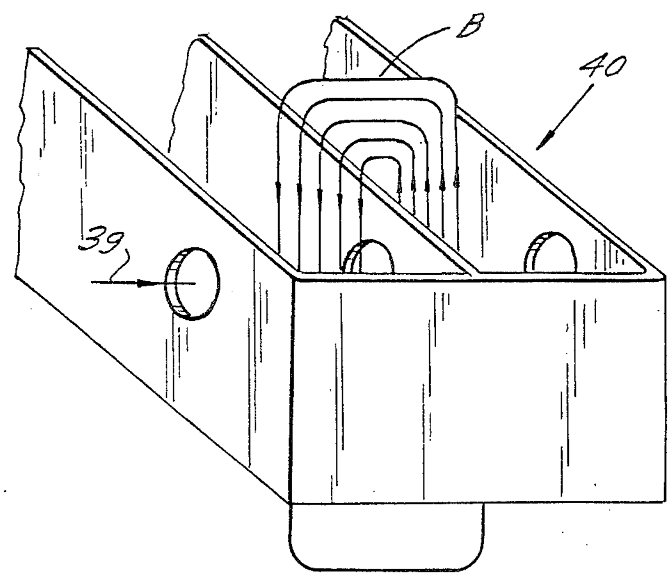

The tip end detail of one element of the undulator is shown in FIG. 6B (rotated by 90° with respect to FIG. 6A). The lines with arrows represent magnetic field lines of force.

Figure 7A:
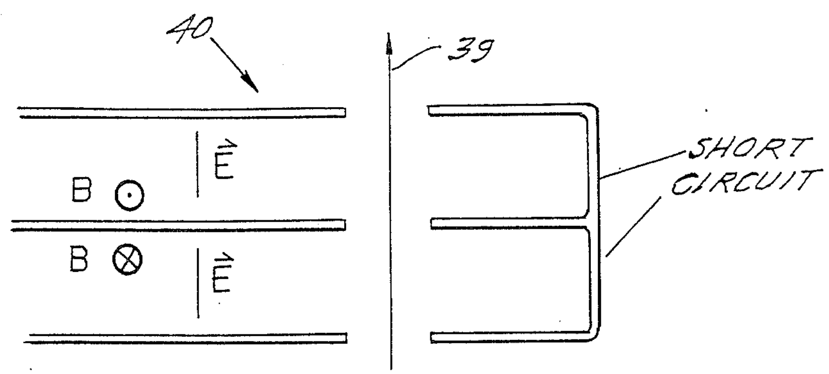
FIGS. 7A and 7B are schematics which show the directions of the electric and magnetic fields in the tip of one element of the undulator.
Figure 7B:
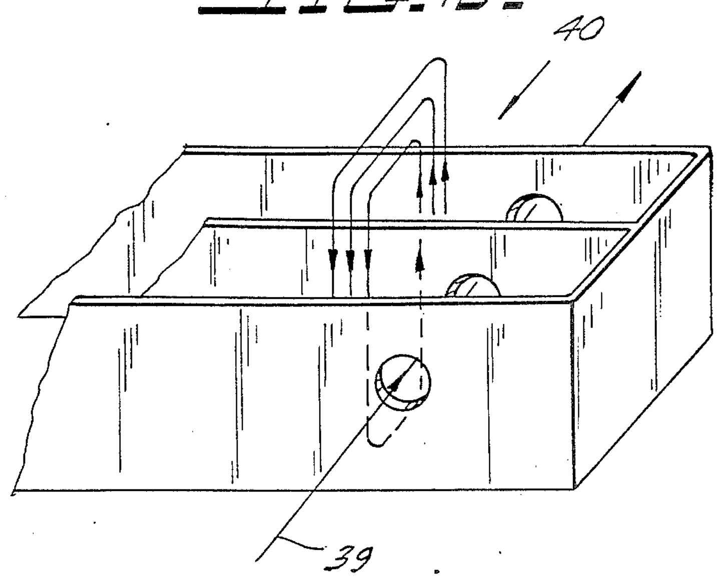

FIGS. 7A and 7B are schematics which show the directions of the electric and magnetic fields in the tip of one element of the undulator. As shown in FIG. 7A, the intensity of the E field is very low, because of a short circuit at the end of a structure. Essentially, only the magnetic field remains, with twice the wave intensity.

Figure 8B:
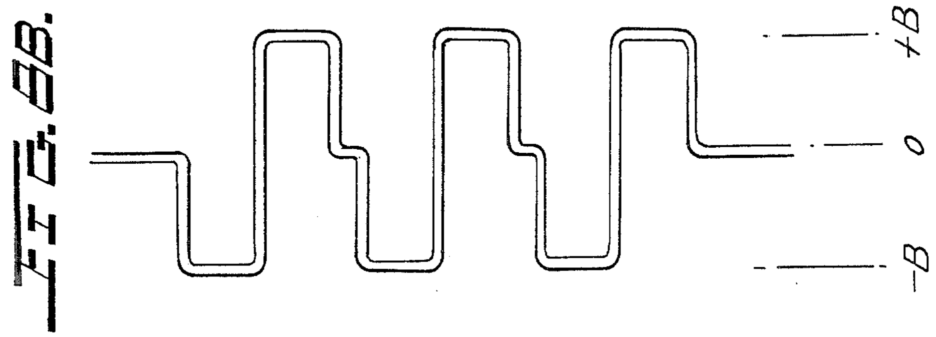
FIG. 8A shows three successive pairs of lines in the undulator, giving a total of three full periods for the magnetic field as shown in FIG. 8B.
Figure 8A:
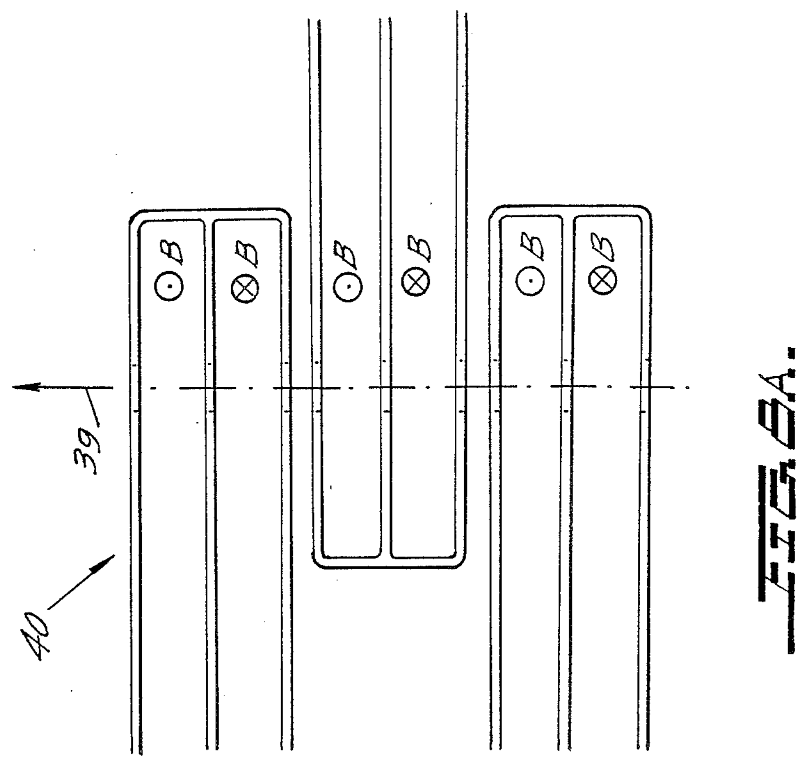

FIG. 8A shows three successive pairs of lines in undulator 40, giving a total of three full periods for the magnetic field as shown in FIG. 8B. Many more structures (up to 50–100) are used to constitute undulator 40.

While the drawings do not illustrate evacuated regions, it should be apparent to those skilled in the art that the path of electrons in both linac 30 and undulator 40 of the FEL extends through a region where vacuum is present, and switch 60 is also in a vacuum.

Since the electric field generated in each element of undulator 40 is held for only a very short time (subnanosecond), the structure is capable of supporting magnetic fields of much greater intensity (on the order of 20 Tesla) than those obtainable from permanent magnet structures. The consequence of this very high magnetic field is that the undulator structure is quite short, such that the entire FEL occupies only a table top.

The following table contains a set of possible parameters for the FEL. These numbers are just a rough estimate of the parameters of a "table top", short wavelength FEL.

| | | | | |
|---|---|---|---|---|
| E max | 4 | 3 | 3 | GeV/m |
| Undulator length | 200 | 200 | 200 | cm |
| Laser Wavelength | 2 | 2 | 150 | nm |
| B | 26 | 20 | 20 | Tesla |
| λ | 0.4 | 0.8 | 0.8 | mm |
| Pulse length, τ | 0.2 | 0.5 | 0.5 | ps |

-continued

| | | | | |
|---|---|---|---|---|
| Current density (J) | 1.3 | 10 | $5.3 \times 10^6$ | A/cm$^2$ |
| $\gamma$ | 460 | 652 | 75 | |
| E beam | 235 | 333 | 38 | Mev |
| Gain/meter | 16 | 8 | 71 | 1/meter |
| Length of accelerating section | 20 | 20 | 20 | cm |
| Beam loading | 0.8% | 0.8% | 0.8% | |
| Wall plug power (approx. 20 pps) | 15 | 15 | 15 | kW |

A practical repetition rate for this machine is of the order of 100/200 pps when using pulse power sources. Higher repetition rates are possible if the structure is driven by synthetic pulse techniques. In any event, pulse to pulse stability is critical Although stability on the order of a fraction of one percent is generally obtainable with well designed pulse power systems, the FEL of the present invention requires extremely stable (short term and long term) values of E and B in linac 30 and undulator 40—on the order of 1 part in 10,000.

In summary, the FEL of the present invention uses the accelerating structure described in Ser. No. 244,121 and another structure similar to Ser. No. 244,121 as an undulator, to convert the electric field to a magnetic field. A small fraction of the electric field is allowed to remain, so that the undulator will return the energy lost to radiation to the beam, keeping the electron bunch at resonance. Because of the high fields possible with pulse power, the machine is extremely compact, as compared to other FELs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A free electron laser, comprising:

first means for emitting charged particles that travel along a linear path;

second means for accelerating said charged particles in an accelerating region, said second means defining a plurality of accelerating gaps disposed in series at said accelerating region, each of said accelerating gaps being defined by a pair of spaced electrodes disposed transverse to said path, each of said electrodes having an aperture through which said linear path extends, said electrodes each being coupled to a source of energy pulses by a respective transmission line, the transmission lines for each pair of spaced electrodes being open circuited at their ends with respect to one another, said charged particles being subjected to an accelerating force generated by an electric field which is derived from each of said energy pulses as said charged particles pass through said accelerating gaps; and third means for generating a plurality of opposing magnetic fields disposed in series along said linear path after said second means, said opposing magnetic fields each being produced by respective pairs of spaced electrodes disposed transverse to said path, each of said electrodes having a aperture through which said path extends, each of said electrodes being connected to a source of energy pulses by respective transmission lines, said transmission lines of each pair of spaced electrodes being substantially short circuited at their ends with respect to one another, said charged particles being subjected to said opposing magnetic fields generated by each of said pulses as said charged particles pass through said third means;

said accelerated charged particles emitting substantially coherent electromagnetic radiation upon being subjected to said opposing magnetic fields.

2. A free electron laser as recited in claim 1, wherein said first means comprises a radial line transformer.

3. A free electron laser as recited in claim 1, wherein said second means comprises a linear accelerator, wherein said pair of transmission lines of adjacent accelerating gaps are disposed 60° apart with respect with one another.

4. A free electron laser as recited in claim 1, wherein said third means comprises an undulator, the transmission lines of said undulator being disposed in a single plane.

5. A free electron laser as recited in claim 4, wherein the termination of said transmission lines of each pair of electrodes of said undulator includes a small amount of impedance in order to generate an electric field to compensate for the energy lost by said charged particles as said charged particles traverse through each opposing magnetic field of said undulator.

6. A free electron laser set forth in claim 1, wherein said energy pulses applied to said second means and said third means are generated by an avalanche-switch device.

* * * * *

UNITED STATES PATENT AND TRADEMARK OFFICE

CERTIFICATE OF CORRECTION

PATENT NO. : 4,972,420

DATED : November 20, 1990

INVENTOR(S) : Villa

It is certified that error appears in the above-identified patent and that said Letters Patent is hereby corrected as shown below:

Column 1, immediately before the section entitled "BACKGROUND OF THE INVENTION", insert the following paragraph:

--The Government has rights in this invention pursuant to Contract No. DE-AC09-76SF005 awarded by the Department of Energy--.

column 2, lines 42-43, change "application Serial No. 244,221 filed September 14, 1988" to --Patent No. 4,893,089, issued January 8, 1990--;

Column 4, line 17, change "application OFGS File M-11720 (417-18)" to --U.S. Application Serial No. 461,059, now U.S. Patent No. 4,975,917--.

Column 7, line 22, change "Serial No. 244,121" to --U.S. Patent No. 4,893,089--;

line 23, change "Serial No. 244,121" to --U.S. Patent No. 4,893,089--.

Signed and Sealed this

Twenty-first Day of July, 1992

*Attest:*

DOUGLAS B. COMER

*Attesting Officer* *Acting Commissioner of Patents and Trademarks*

UNITED STATES PATENT AND TRADEMARK OFFICE
CERTIFICATE OF CORRECTION

PATENT NO. : 4,972,420

DATED : November 20, 1990

INVENTOR(S) : Villa

It is certified that error appears in the above-identified patent and that said Letters Patent is hereby corrected as shown below:

Column 1, immediately before the section entitled "BACKGROUND OF THE INVENTION", insert the following paragraph:

--The Government has rights in this invention pursuant to Contract No. DE-AC03-76SF00515 awarded by the Department of Energy--.

Signed and Sealed this

First Day of September, 1992

*Attest:*

DOUGLAS B. COMER

*Attesting Officer*

*Acting Commissioner of Patents and Trademarks*